Patented Aug. 24, 1954

2,687,444

UNITED STATES PATENT OFFICE 2,687,444

VULCANIZABLE RUBBERY POLYMER COMPOSITIONS COMPRISING ZINC MONO ALKYLBENZENE SULFONATES AS VULCANIZATION RETARDERS

Willie W. Crouch and William B. Reynolds, Bartlesville, Okla., assignors to Phillips Petroleum Company, a corporation of Delaware No Drawing. Application January 4, 1950,
Serial No. 136,848

11 Claims. (Cl. 260—763)

This invention relates to processing vulcanizable organic plastic substances, such as natural and/or synthetic rubbers. In one of its more specific aspects it relates to new retarders of vulcanization to prevent natural and/or synthetic rubber mixes from scorching during processing. In still another of its more specific aspects it relates to new vulcanizable rubber mixes and vulcanized rubber products and methods for their production.

In the manufacture of rubber products, to produce such products as tire treads, tubes, casings, molded goods, and the like, crude rubber is milled with the desired fillers, modifiers, softeners, tackifiers and plasticizing substances, antioxidant, vulcanizing agent, accelerators, etc. In the first stage of plant processing, carbon black and other ingredients, except the accelerator of vulcanization and sulfur, are added with the mixing temperature usually reaching a maximum in the range of 290 to 330° F., especially for tread compounds. The mixed stock, whether mill mixed or Banbury mixed, is cooled with a water spray in order to aid in reducing the temperature of the mixed stock to room temperature as soon as possible. After this first-stage mixing, the rubber mix is placed on what is termed a "sheet-out" mill and the mixed stock is cut in slabs and subjected to a water spray. These slabs are then cooled in the air, usually for about one-half to three-quarters of an hour, and then placed on a skid to age, generally for a minimum of 5 hours. A second step is to take this master batch form and add the accelerator and a sulfur vulcanizing agent in a Banbury mixer, on a mill, or in any other suitable manner. During this step the temperature should not be greater than 230° F., decidedly cooler than the original mix when the carbon black is added. This final mix is cooled with a water spray, air-cooled and then aged at room temperature. This mixed stock is cooled as rapidly as possible in order to avoid "scorched" material. The next step in processing is calendering, extruding, molding, etc., which is usually carried on in the range of 150 to 300° F. The calendered, extruded, molded, etc. product is then vulcanized. The most common vulcanizing temperature for tires is 260 to 300° F. For very large tires the curing temperature may be dropped to as low as 260° F. In the case of molded industrial products, a temperature of about 320° F. is the upper range at which vulcanization is carried out. In carrying out the plant processes of second-stage mixing and of calendering, extruding or making a molded industrial product, it is necessary that the mixed rubber not be partially vulcanized prematurely. If vulcanization occurs prematurely in factory processing, factory operations cannot be carried out efficiently. This premature vulcanization is known as scorching.

In the manufacture of rubber products accelerators of vulcanization are added to speed up the curing of the formed rubber product. Today the usual practice is to use certain well-known accelerators of vulcanization, usually semi-ultra and/or ultra organic accelerators, which not only have the property of speeding up the curing process but also through their action give a rubber product which has good physical properties, such as high tensile strength, high resistance to abrasion, etc. Many organic accelerators of vulcanization speed up the curing process to a greater extent than is desired; therefore, it is necessary to use a retarder of vulcanization so that the rubber mix will not vulcanize so rapidly so as to make it impossible to carry out the necessary steps of factory processing. The rubber compounder and the rubber industry are always striving to find new methods of retarding vulcanization so that the rubber and/or rubber mix can be processed efficiently and so that the final rubber product will have improved physical characteristics.

In recent years many new carbon blacks have become available to the rubber industry. Chief among these new carbon blacks are combustion furnace blacks, which in general have a higher pH than the older type of channel black or thermal furnace carbon blacks. Combustion furnace carbon blacks usually have a pH of from 8 to 10.5, more frequently from 8.6 to 10.1. For instance, one commercially available high abrasion combustion furnace (HAF) black, has a pH of approximately 9.1 and a commercially available high modulus combustion furnace (HMF) black, has a pH of approximately 9.7. In contrast to these furnace blacks, channel blacks usually have a pH value on the acid side in the neighborhood of 3.8 to 6. Furnace blacks, such as those just mentioned, have many characteristics which add useful properties to the finished rubber product. Thus the HAF black has a high degree of "structure" and rubber products containing this black have exceptionally high resistance to abrasion. There are several high pH furnace blacks now on the market which add valuable properties to the finished rubber product. These high pH carbon blacks have caused considerable difficulty to the rubber compounder and processor as pointed out by C. W. Sweitzer and W. C. Goodrich in The Rubber Age, volume 55, No. 5, August 1944, at page 471. The pH of the carbon black has a decided effect on the rate of vulcanization. High pH carbon blacks usually accelerate cure or vulcanization. Sweitzer and Goodrich point out that due to this factor economy in organic acceleration is permitted. However, in most cases changing the recipe of a rubber mix, that is, changing the amount of organic accelerator and sulfur, also changes the properties of the finished rubber product. It has an effect on such properties as tensile strength, heat build-up, the compression set, the hardness, the resistance to abrasion, the modulus of elasticity, the elongation, etc. The rubber compounder using these high pH carbon blacks has been confronted with the problem of maintaining the desired properties in the finished product by maintaining the proper amount of retarder, accelerator and sulfur while trying to overcome the problem of scorch or premature vulcanization. Well-known retarders of vulcanization, such as N-nitroso diphenyl amine, rosin, and salicyclic acid in a dispersing agent have been unsuccessful in overcoming the problem of too rapid vulcanization caused by the use of high pH carbon blacks.

We have now discovered that zinc salts of certain organic sulfo acids, namely the zinc salts of selected aliphatic substituted benzene sulfonic acids or aliphatic sulfuric acids, will retard vulcanization of rubber and will improve the properties of the vulcanized rubber product. Our retarders are particularly valuable in retarding vulcanization of rubber mixes wherein a high pH carbon black, particularly a high pH furnace carbon black, is used as a filler. Incorporating the retarders of our invention will effectively delay vulcanization so that the rubber mix may be processed without encountering scorch. We have discovered a new method for retarding vulcanization of a rubber mix which comprises incorporating zinc salts of selected aliphatic substituted benzene sulfonic acids or aliphatic sulfuric acids, hereinafter defined, in the rubber mix. The use of these retarders with accelerators of vulcanization, particularly semi-ultra and ultra organic accelerators, improves the physical properties of the finished rubber product. A great advantage of our invention is that the use of zinc aliphatic substituted benzene sulfonates or zinc aliphatic sulfates to effect the retardation of vulcanization will overcome any problem of scorching, such as that caused by the use of a high pH carbon black, and, at the same time, improve the physical properties of the finished rubber product.

The zinc aliphatic substituted benzene sulfonates used in the practice of our invention are of the general formula

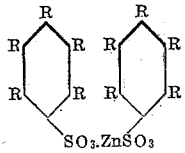

where each R is hydrogen or an aliphatic group and the sum of the carbon atoms in aliphatic groups attached to one benzene ring is at least 10 and does not exceed 30. The zinc salts of aliphatic sulfuric acids used in the practice of our invention have the formula $(R'—OSO_3)_2Zn$, where each R' is an aliphatic hydrocarbon group containing from 8 to 20 carbon atoms. Mixtures of compounds falling within these groups can be successfully employed as retarders of vulcanization. In each of the above formulas the aliphatic group may be alkyl, cycloalkyl, alkenyl or cycloalkenyl. For instance, the following compounds are typical examples of specific compounds which can be used as retarders according to our invention, zinc lauryl sulfate, zinc myristyl sulfate, zinc palmityl sulfate, zinc stearyl sulfate, zinc oleyl sulfate, zinc linolyl sulfate, zinc linolenyl sulfate, zinc dodecylcyclopentyl sulfate, zinc butylcyclohexenyl sulfate, zinc capryl sulfate, zinc decylxylene sulfonate, zinc hexadecylbenzene sulfonate, zinc tetradecylbenzene sulfonate, zinc tridecylbenzene sulfonate, zinc dodecylbenzene sulfonate, zinc octylxylene sulfonate, and the like, and various mixtures thereof.

It is an object of this invention to provide a method for retarding vulcanization of vulcanizable organic plastic mixes, such as natural and/or synthetic rubber mixes.

It is a further object of this invention to provide a method by which premature vulcanization of vulcanizable organic plastic mixes, such as natural and/or synthetic rubber mixes, can be prevented.

It is another object of this invention to provide new vulcanizable natural and/or synthetic rubber mixes and vulcanized natural and/or synthetic rubber products with improved properties.

It is still another object of this invention to provide a method to increase the Mooney scorch of a natural and/or synthetic rubber mix which has a low scorch time due to high pH carbon black being used in the mix.

Still another object of this invention is to provide a method for retarding vulcanization of a natural and/or synthetic rubber mix so as to overcome the problem of scorch during process and to give the finished rubber product improved physical properties.

Another object of this invention is to provide new vulcanization retarders.

Other objects and advantages of this invention will become apparent to one skilled in the art, upon reading this disclosure.

Premature vulcanization, referred to as "scorch" during the processing of rubber products, must be prevented in order to allow the rubber mix to be pre-formed and shaped before it is cured or vulcanized. Testing methods, run on test samples, have been devised and standards have been set so as to determine if a particular rubber mix will scorch during processing. The most frequently used testing method is that run on a Mooney Shearing Disc Viscometer. These Mooney viscometers come equipped with a large rotor (1½ inches in diameter) and a small rotor (1 3/16 inches in diameter). The viscometer can be set to operate at a given temperature. The Mooney scorch test is made by using the small rotor with the machine usually set to operate either at 250° F. or 265° F., that is, the temperature of the rubber sample on which the scorch test is being run is held at 250° F. or 265° F. Primarily, the instrument consists of a disc rotor which turns in a shallow cylindrical chamber recessed into two horizontal platens. The surfaces of the chamber and rotor are knurled to prevent slippage. The sample is formed in place around the rotor as the chamber is closed. The rubber is sheared by the rotor which is driven by a synchronous motor. The resistance of the rubber to this shearing action develops a thrust in a floating horizontal worm shaft which presses against a deflecting U-shaped steel spring. The deflection is read on a dial gauge and is proportional to the true mean viscosity of the sample. In determining the scorch time, deflection readings are taken at one minute intervals until the deflection of the indicator increases appreciably. At this point the viscosity of the rubber mix sample has increased due to the beginning of vulcanization. The Mooney scorch time is then given as the time in minutes at which vulcanization began, indicated by the appreciable increase in viscosity readings. In this disclosure Mooney scorch time when used means the time in minutes at which the viscosity of the sample began to increase appreciably because of vulcanization. Mooney Shearing Disc Viscometers are widely used in the rubber industry, and one skilled in the art will have no difficulty in determining and understanding what we mean by the Mooney scorch time.

Our scorch retarders can be incorporated in the rubber mix, preferably in finely divided or powdered form, before curing, or after the other ingredients are added. In practicing our invention the retarder can be added either on a mill, in a Banbury mixer, or other suitable mixing device, or it can be mixed with the carbon black before the black is added in the first stage of mixing. The amount of the scorch retarder used depends on the particular ingredients in the rubber mix, the pH of the carbon black, the accelerator used and its amount, the amount of sulfur and the type of rubber. In any event, the amount is determined by the case at hand, and will normally be in the range from 0.5 to 6 parts by weight per 100 parts by weight of rubber, usually from 1.0 to 4 parts by weight per 100 parts by weight of rubber.

The term "rubber," as used in this disclosure, is intended to cover both natural and synthetic rubbers. The new retarders of our invention are broadly applicable to vulcanization of non-halogen-containing vulcanizable organic plastic materials containing unsaturated carbon to carbon bonds. They are applicable to natural rubbers and synthetic rubbers, such as polymers of conjugated diolefins, such as 1,3-butadiene, isoprene, etc., or copolymers of such diolefins with a compound containing the group $CH_2=C<$, such as styrene, acrylonitrile, and the like. However, they are not applicable to retarding the vulcanization of polymers of chloroprene. Our new retarders can be used in rubber mixes containing new or reclaimed natural or synthetic rubbers, or various mixtures of same.

Fillers or fillers and modifiers are added in compounding rubber in most cases. While our invention is particularly valuable in retarding the vulcanization of rubber mixes containing high pH carbon blacks, such as high abrasion furnace carbon blacks (HAF blacks), high modulus furnace carbon blacks (HMF blacks), reinforcing furnace carbon blacks (RF blacks), and very fine furnace carbon blacks (VFF blacks), and the like, it is to be understood that our new retarders of vulcanization can be used in rubber mixes containing other carbon blacks and/or other fillers or pigments, such as easy, medium or hard processing channel blacks, lamp blacks, fine and medium thermal carbon blacks, acetylene carbon blacks, semi-reinforcing carbon blacks, conductive furnace and conductive channel carbon blacks, high elongation carbon blacks, ferric oxide, magnesium carbonate, titanium dioxide, zinc oxide, hydrated alumina, kieselguhr, slate dust, silicas, lead oxide, glue, barytes, fossil flour, lithapone, various clays, whiting, etc. Many of these compounds are added as fillers and to modify the properties of the vulcanizable compositions or vulcanized compositions, for instance, to activate acceleration. Most rubber mixes contain from 10 to 65, tire tread stocks from 35 to 65, parts by weight of carbon black per 100 parts by weight of rubber, and in a very valuable application, our invention is used to retard vulcanization so as to prevent scorch of natural rubber tire tread stocks containing such amounts of a high pH furnace carbon black. Natural rubber stocks containing high pH furnace carbon blacks are very "scorchy," which causes processing difficulty.

Vulcanizing agents are added to vulcanize the rubber during the vulcanization step of processing. Our new retarders can be used in rubber mixes containing a sulfur vulcanizing agent, such as sulfur, including powdered sulfur, or in one or more other forms, and mixtures thereof, so-called plastic sulfurs, and the like. It is the usual practice to employ sulfur in the range from 1 to 3, more usually 2 to 2.75, parts by weight per 100 parts by weight of rubber.

Our invention is applicable to rubber mixes containing organic accelerators of vulcanization, such as thioureas, thiophenols, mercaptans, dithiocarbamates, xanthates, trithiocarbonates, dithio acids, mercaptothiazoles, mercaptobenzothiazoles, thiuram sulfides, etc., or various mixtures of the aforementioned organic accelerators. The ultra and semi-ultra accelerators of vulcanization tend to cause scorching when used with high pH carbon blacks. Our invention is particularly adaptable to retarding vulcanization in rubber mixes containing mercaptobenzothiazole or its derivatives, such as benzothiazyl disulfide, zinc benzothiazyl sulfide, acyl benzothiazyl sulfides and the dinitro phenyl ester of mercaptobenzothiazole, thiuram sulfides, such as thiuram monosulfide, guanidines, such as diphenylguanidine, or various mixtures of the aforementioned organic accelerators. We find that our retarders give excellent results with N-cyclohexyl-2-benzothiazole sulfenamide, a widely used delayed action accelerator known as Santocure which is activated by high pH carbon black so that it loses some of its property of delaying rapid acceleration of vulcanization, or in effect delaying rapid vulcanization, until the curing step of processing. Organic accelerators are normally used in an amount of from 0.1 to 4, more usually 0.35 to 3, parts by weight per 100 parts by weight of rubber. Santocure is usually employed in an amount of from 0.25 to 1.75, more usually 0.35 to 0.65, parts by weight per 100 parts by weight of rubber. It is usually the practice or necessary to add softeners, tackifiers and plasticizing substances during the compounding of the rubber. There are many such substances, among which are vegetable oils, such as palm oil, rape oil, olive oil, linseed oil, castor bean oil, soya bean oil, tung oil; bitumens including so-called mineral rubbers, which comprise natural products, such as gilsonite, rafaelite, and also high-boiling petroleum residues, asphalts, etc.; pine tar; paraffin wax; paraffins; fatty acids, such as oleic acid, stearic acid, palmitic acid, lauric acid, etc.; ceresin; naphthalenes; rosin, wool grease; carnauba wax; the many organic chemical compounds, such as glycerol, glyceryl monostearate, glyceryl monooleate, glyceryl monoricinoleate, trioctyl phosphate, triglycol dioctoate, ethylene glycol monostearate and the monooleate, phenolformaldehyde thermosetting resins, poly-alpha-methylstyrene, and other polymers of styrene and substituted styrene, dioctyl phthalate, dioctyl sebacate, polybutenes, zinc resinate, coumarone resins, dihydroabietic acid, etc. Most of these compounds aid tackiness as well as soften or plasticize the rubber. Also, some of them exhibit modifying characteristics.

In most cases it is the usual practice to add age resistors or antioxidants to rubber mixes during the mixing step of processing in order to slow down or prevent the deterioration of the vulcanized product. Antioxidants or age resistors have the property of maintaining tensile strength, resistance to abrasion, elasticity, preventing flex cracking, etc. One or more antioxidants are usually employed, such as phenyl-beta-naphthylamine, p-amino-phenol, hydroquinone, p-hydroxydiphenyl, diphenylamine, 2,4-n-toluylene diamine, p-ditolylamine, o-ditolylamine, beta-naphthyl-nitroso amine, diphenyl diamino-ethane, phenyl-alpha-naphthyl amine, p,p'-diamino-diphenylmethane, etc.

The rubber compositions of our invention, resulting from admixing the various ingredients with the new retarders of our invention by the methods known in the prior art, are vulcanized in the usual manner after they are molded or shaped into the desired shape by the numerous shaping operations of the prior art, such as calendering, casting from solution, continuous or discontinuous extrusion, molding in open or closed molds, etc., and they can be used for the many purposes for which other similar compositions are used. For example, they can be used for tire tubes, tire treads, tire casings, shoe soles and heels, raincoats, table covers, hose for the transmission of fluids, belts, balloon coverings, printers rolls, printers blankets, engraving plates, aprons, gloves, masks, tanks, battery cases, friction tape mats, wire insulation, etc. Fabrics can be coated or impregnated by calendering or impregnation with a suitable emulsion.

The following are set forth as examples of our invention. It is to be understood that the quantities, materials, etc., set forth in the following examples are not to unduly limit the scope of our invention.

EXAMPLE I

In the following examples, PHR means parts by weight per 100 parts by weight of rubber.

Natural rubber (smoked sheet) was compounded in accordance with the following recipes. The figures represent parts by weight.

| Batch No. | 1 | 2 | 3 |
|---|---|---|---|
| Natural Rubber | 100 | 100 | 100 |
| HAF Carbon Black (pH 9.1) | 50 | 50 | 50 |
| Zinc Oxide | 4 | 4 | 4 |
| Stearic Acid | 3 | 3 | 3 |
| Asphalt Softener | 6 | 6 | 6 |
| Phenyl-B-Naphthylamine | 2 | 2 | 2 |
| Sulfur | 2 | 2 | 2 |
| Santocure | 0.4 | 0.6 | 0.6 |
| Zinc Alkylbenzene Sulfonate [1] | | 1.0 | 3.0 |

[1] A mixture of monoalkylbenzene sulfonates containing 12-14 carbon atoms in the alkyl group.

The mixes were milled and cured for varying lengths of time at 307° F. The batch containing no zinc alkylbenzene sulfonate was included for comparative purposes. The scorch data is tabulated immediately below.

| Batch No. | Parts by Weight of Zinc Alkylbenzene Sulfonate Per 100 Parts of Rubber | Mooney Scorch at 250° F., Minutes |
|---|---|---|
| 1 | 0 | 12 |
| 2 | 1 | 15 |
| 3 | 3 | 23 |

It will be noted that only 3 parts of the zinc alkylbenzene sulfonate almost doubled the scorch time. Other physical properties are listed below.

*Stress-strain properties at 80° F.*

| Batch No. | PHR Santocure | PHR Zinc Alkylbenzene Sulfonate | Minutes' Cure at 307° F. | Modulus, p. s. i. at— | | | | | Break | Percent Elongation |
|---|---|---|---|---|---|---|---|---|---|---|
| | | | | 100% | 200% | 300% | 400% | 500% | | |
| 1 | 0.4 | | 10 | 175 | 530 | 1,235 | 1,785 | 2,530 | 3,310 | 605 |
| | | | 20 | 240 | 770 | 1,475 | 2,225 | 2,950 | 3,590 | 585 |
| | | | 30 | 225 | 660 | 1,325 | 2,060 | 2,810 | 3,310 | 565 |
| | | | 45 | 230 | 670 | 1,340 | 2,020 | 2,770 | 3,170 | 550 |
| | | | 75 | 210 | 610 | 1,230 | 1,910 | 2,600 | 2,950 | 560 |
| 2 | 0.6 | 1.0 | 10 | 235 | 620 | 1,330 | 2,025 | 2,740 | 3,580 | 615 |
| | | | 20 | 280 | 820 | 1,530 | 2,275 | 3,050 | 3,825 | 600 |
| | | | 30 | 280 | 800 | 1,520 | 2,275 | 3,070 | 3,570 | 560 |
| | | | 45 | 270 | 760 | 1,435 | 2,180 | | 3,460 | |
| | | | 75 | 265 | 630 | 1,370 | 2,125 | 2,870 | 3,280 | 560 |
| 3 | 0.6 | 3.0 | 10 | 160 | 380 | 780 | 1,275 | 1,870 | 2,540 | 600 |
| | | | 20 | 235 | 600 | 1,170 | 1,810 | 2,500 | 3,050 | 575 |
| | | | 30 | 230 | 640 | 1,225 | 1,880 | 2,600 | 3,290 | 595 |
| | | | 45 | 240 | 630 | 1,210 | 1,895 | 2,610 | 3,225 | 585 |
| | | | 75 | 250 | 680 | 1,270 | 1,895 | 2,570 | 3,150 | 585 |

*Stress-strain properties at 200° F*

| Batch No. | PHR Santocure | PHR Zinc Alkylbenzene Sulfonate | Minutes' Cure at 307° F. | P. s. i. at— | | | Break | Percent Elongation |
|---|---|---|---|---|---|---|---|---|
| | | | | 100% | 200% | 300% | | |
| 1 | 0.4 | | 20 | 250 | 520 | 920 | 2,790 | 670 |
| | | | 45 | 170 | 410 | 760 | 2,530 | 650 |
| 2 | 0.6 | 1.0 | 20 | 260 | 530 | 1,040 | 3,090 | 695 |
| | | | 45 | 190 | 480 | 920 | 2,960 | 710 |
| 3 | 0.6 | 3.0 | 20 | 130 | 330 | 620 | 2,650 | 780 |
| | | | 45 | 200 | 430 | 780 | 2,710 | 695 |

Stress-strain properties at 80° F.

[Oven aged 24 hrs. at 212° F.]

| Batch No. | PHR Santocure | PHR Zinc Alkylbenzene Sulfonate | Minutes' Cure at 307° F. | P. s. i. at— | | | | Percent Elongation |
|---|---|---|---|---|---|---|---|---|
| | | | | 100% | 200% | 300% | Break | |
| 1 | 0.4 | | 10 | 330 | 900 | 1,550 | 2,680 | 485 |
| | | | 30 | 350 | 900 | 1,575 | 2,380 | 417 |
| | | | 75 | 310 | 750 | 1,300 | 2,015 | 470 |
| 2 | 0.6 | 1.0 | 10 | 380 | 1,000 | 1,710 | 2,860 | 490 |
| | | | 30 | 420 | 1,025 | 1,760 | 2,620 | 445 |
| | | | 75 | 360 | 930 | 1,480 | 2,175 | 415 |
| 3 | 0.6 | 3.0 | 10 | 220 | 585 | 1,040 | 2,010 | 500 |
| | | | 30 | 325 | 780 | 1,430 | 1,940 | 420 |
| | | | 75 | 300 | 725 | 1,190 | 1,790 | 430 |

Hysteresis properties

[HBU—100° F. oven, 143 p. s. i. load, 0.175" stroke resilience Yerzley, 12–13 weights inertia load, 16–20% deflection.]

| Batch No. | PHR Santocure | PHR Zinc Alkylbenzene Sulfonate | Minutes' Cure at 307° F. | $\Delta T$, °F. | 10% Dynamic p. s. i. | | Percent Permanent Set | Percent Resilience | Static p. s. i. | |
|---|---|---|---|---|---|---|---|---|---|---|
| | | | | | Initial | Final | | | 10% | 20% |
| 1 | 0.4 | | 20 | | | | | 72.8 | 33.5 | 67.0 |
| | | | 30 | 47.3 | 87.2 | 81.8 | 2.1 | 72.0 | 34.0 | 68.0 |
| | | | 45 | 50.3 | 82.6 | 76.2 | 2.0 | 70.3 | 32.4 | 64.5 |
| | | | 75 | | | | | 67.1 | 29.1 | 56.6 |
| 2 | 0.6 | 1.0 | 20 | | | | | 73.3 | 35.8 | 71.8 |
| | | | 30 | 46.5 | 99.2 | 93.3 | 1.7 | 72.5 | 37.5 | 75.5 |
| | | | 45 | 46.9 | 95.2 | 86.4 | 1.5 | 71.5 | 35.6 | 71.2 |
| | | | 75 | | | | | 71.6 | 33.8 | 67.4 |
| 3 | 0.6 | 3.0 | 20 | | | | | 64.2 | 32.6 | 65.0 |
| | | | 30 | 58.5 | 89.4 | 70.4 | 4.5 | 65.6 | 35.8 | 71.8 |
| | | | 45 | 59.1 | 98.3 | 79.0 | 3.0 | 66.0 | 38.2 | 76.0 |
| | | | 75 | | | | | 66.8 | 34.0 | 68.1 |

[Oven aged 24 hrs./212° F.]

| Batch No. | PHR Santocure | PHR SATS | PHR Zinc Alkylbenzene Sulfonate | Minutes' Cure at 307° F. | $\Delta T$, °F. | 10% Dynamic p. s. i. | | Percent Permanent Set | Percent Resilience | Static p. s. i. | |
|---|---|---|---|---|---|---|---|---|---|---|---|
| | | | | | | Initial | Final | | | 10% | 20% |
| 1 | 0.4 | | | 20 | | | | | 75.8 | 39.9 | 80.4 |
| | | | | 30 | 44.6 | 102.2 | 96.2 | 1.2 | 74.7 | 36.5 | 73.5 |
| | | | | 45 | 51.7 | 90.0 | 81.2 | 1.8 | 70.9 | 33.5 | 66.8 |
| | | | | 75 | | | | | 69.4 | 31.6 | 62.4 |
| 2 | 0.6 | | 1.0 | 20 | | | | | 76.6 | 38.8 | 80.0 |
| | | | | 30 | 46.6 | 121.2 | 108.1 | 0.9 | 73.3 | 35.0 | 70.4 |
| | | | | 45 | 46.6 | 111.8 | 99.0 | 1.0 | 73.4 | 36.9 | 74.5 |
| | | | | 75 | | | | | 72.2 | 34.5 | 68.9 |
| 3 | 0.6 | | 3.0 | 20 | | | | | 68.7 | 40.6 | 81.2 |
| | | | | 30 | 53.4 | 114.5 | 96.8 | 1.9 | 68.0 | 40.6 | 81.8 |
| | | | | 45 | 55.1 | 117.2 | 93.0 | 1.7 | 66.9 | 42.4 | 82.5 |
| | | | | 75 | | | | | 64.7 | 37.7 | 75.6 |

Flex life, Shore hardness, abrasion loss

[Flex life at 210° F., 3" stroke, 500 flexures per minute; Shore hardness—type A durometer; abrasion loss—11° wheel angle, 33 lb. load, 3,000 revolutions per minute rotated on the mounts every 375 revolutions.]

| Batch No. | PHR Santocure | PHR Zinc Alkylbenzene Sulfonate | Minutes' Cure at 307° F. | Flex Life, percent | Shore Hardness | Abrasion Loss,[1] Grams |
|---|---|---|---|---|---|---|
| 1 | 0.4 | | 30 | [2] 9 | 60 | 5.98 |
| | | | 45 | [2] 13 | 58 | |
| | | | 75 | [2] 13 | 56 | |
| 2 | 0.6 | 1.0 | 30 | [2] 18 | 61 | 5.45 |
| | | | 45 | [2] 10 | 60 | |
| | | | 75 | [2] 15 | 59 | |
| 3 | 0.6 | 3.0 | 30 | [2] 15 | 62.5 | 5.60 |
| | | | 45 | [2] 12 | 61 | |
| | | | 75 | [2] 14 | 60 | |

[1] 35' cure time.
[2] Percent broken at 50,000 flexures.

EXAMPLE II

Natural rubber (smoked sheet) was compounded in accordance with the following recipe. The figures represent parts by weight.

| | |
|---|---|
| Natural rubber | 100 |
| HAF carbon black | 50 |
| Zinc oxide | 4 |
| Asphalt softener | 3 |
| Phenyl-B-naphthylamine | 1.5 |
| Sulfur | 2 |
| Santocure | Variable |
| Zinc lauryl sulfate | Variable |

Three batches were made up according to this recipe and vulcanized using zero, one and two parts of the zinc lauryl sulfate. A summary of the physical properties at 30 minute cure times is presented in the accompanying table. The improved scorch time of the compounds containing the sulfates are noteworthy, especially since these compounds contained more accelerator (Santocure) than the rubber mix containing none of the scorch retarder. (See accompanying table.)

Table—Example II

PHYSICAL PROPERTIES OF NATURAL RUBBER COMPOUNDS—EFFECT OF SCORCH RETARDERS

| Scorch Retarder | PHR Retarder | Stress Strain Properties, 80° F. | | | | Hysteresis Properties | | | Flex Life,[2] percent | Shore Hardness | Aged Abrasion Loss[1] (Gms.) | Percent Comp. Set | MS 1½ Compounded, Mooney | Scorch at 250° F. | |
|---|---|---|---|---|---|---|---|---|---|---|---|---|---|---|---|
| | | PHR Santocure | 300% Modulus, p. s. i. | Tensile, p. s. i. | Percent Elongation | $\Delta T$, ° F. | Percent Resilience | Percent Permanent Set | | | | | | Minimum Mooney | Minutes to Scorch |
| Zinc Lauryl Sulfate | 1.0 | 0.65 | 1,610 | 3,430 | 520 | 50.7 | 68.8 | 1.9 | 17.3 | 60.5 | 7.38 | 19.3 | 37.5 | 49 | 12.5 |
| | 2.0 | 0.70 | 1,460 | 3,510 | 545 | 51.0 | 68.4 | 2.6 | 20.0 | 61 | 7.57 | 23.5 | 37 | 50 | 16.5 |
| None | | 0.50 | 1,530 | 3,610 | 530 | 48.7 | 69.8 | 2.1 | 15.0 | 59.5 | 7.71 | 19.8 | 38.5 | 54 | 12.0 |

[1] 35′ cure.
[2] Percent broken at 50,000 flexures.

As will be evident to those skilled in the art, various modifications of this invention can be made, or followed, in the light of this disclosure and discussion, without departing from the spirit or scope of this disclosure or from the scope of the claims.

We claim:

1. In the process of making a natural rubber product wherein the rubber mix, containing from 10 to 65 parts by weight of a furnace carbon black having a pH of from 8 to 10.5, from 0.1 to 4 parts by weight of an organic accelerator of vulcanization and from 1 to 3 parts by weight of sulfur, each per 100 parts by weight of said natural rubber, is formed and vulcanized, that improvement which comprises adding to said rubber mix from 0.5 to 6 parts by weight per 100 parts by weight of said natural rubber of a zinc salt of a mixture of monoalkylbenzene sulfonates containing 12 to 14 carbon atoms in the alkyl group.

2. A vulcanizable composition, comprising a non-halogen-containing sulfur vulcanizable organic plastic material selected from the group consisting of natural rubber and polymers of conjugated diolefins, sulfur, an organic accelerator of vulcanization, and a zinc salt of a mixture of monoalkylbenzene sulfonates containing 12 to 14 carbon atoms in the alkyl group.

3. The vulcanizable composition of claim 2 wherein said sulfur is present in an amount of 1 to 3 parts by weight per 100 parts by weight, said organic accelerator is present in an amount of from 0.1 to 4 parts by weight, and said zinc salt is present in an amount of from 0.5 to 6 parts by weight, each per 100 parts by weight of said vulcanizable organic plastic material.

4. The vulcanizable composition of claim 2 wherein said vulcanizable organic plastic material is natural rubber.

5. The vulcanizable composition of claim 4 wherein said sulfur is present in an amount of from 2 to 2.75 parts by weight, said organic accelerator is present in an amount from 0.35 to three parts by weight and said zinc salt is present in an amount of from 1 to 4 parts by weight, each per hundred parts by weight of said natural rubber.

6. The vulcanizable composition of claim 2 wherein said vulcanizable organic plastic is natural rubber and said organic accelerator is N-cyclohexyl-2-benzothiazole sulfenamide.

7. The vulcanizable composition of claim 6 wherein said sulfur is present in an amount of from 1 to 3 parts by weight, said N-cyclohexyl-2-benzothiazole sulfenamide is present in an amount of from 0.25 to 1.75 parts by weight and said zinc salt is present in an amount of from 1 to 4 parts by weight, each per hundred parts by weight of natural rubber.

8. A vulcanizable composition, comprising a non-halogen-containing sulfur vulcanizable organic plastic material selected from the group consisting of natural rubber and polymers of conjugated diolefins, a high pH furnace carbon black, sulfur, an organic accelerator of vulcanization, and a zinc salt of a mixture of monoalkylbenzene sulfonates containing 12 to 14 carbon atoms in the alkyl group.

9. The vulcanizable composition of claim 8 wherein said high pH furnace black has a pH of from 8 to 10.5 and is present in an amount of from 10 to 65 parts by weight, said sulfur is present in an amount of from 1 to 3 parts by weight, said organic accelerator is present in an amount of from 0.1 to 4 parts by weight, and said zinc salt is present in an amount of from 0.5 to 6 parts by weight, each per hundred parts by weight of said vulcanizable organic plastic material.

10. The vulcanizable composition of claim 9 wherein said vulcanizable organic plastic is natural rubber, said high pH furnace black is present in an amount of from 45 to 65 parts by weight, said organic accelerator is present in an amount of from 0.35 to 3 parts by weight and said zinc salt is present in an amount of from 1 to 4 parts by weight, each per hundred parts by weight of said natural rubber.

11. In the process of making a product from a non-halogen-containing sulfur vulcanizable organic plastic material selected from the group consisting of natural rubber and polymers of conjugated diolefins, wherein during processing a mix is made containing said vulcanizable organic plastic material in admixture with an organic accelerator of vulcanization and sulfur, that improvement which comprises adding to said mix a zinc salt of a mixture of monoalkylbenzene sulfonates containing 12 to 14 carbon atoms in the alkyl group.

References Cited in the file of this patent

UNITED STATES PATENTS

| Number | Name | Date |
|---|---|---|
| 1,871,037 | Cadwell | Aug. 9, 1932 |
| 2,100,370 | Williams | Nov. 30, 1937 |
| 2,432,461 | Vesce | Dec. 9, 1947 |
| 2,567,853 | Morgan | Sept. 11, 1951 |
| 2,582,829 | Harbison | Jan. 15, 1952 |